United States Patent
Plumpe

(10) Patent No.: US 8,380,508 B2
(45) Date of Patent: Feb. 19, 2013

(54) LOCAL AND REMOTE FEEDBACK LOOP FOR SPEECH SYNTHESIS

(75) Inventor: Michael D. Plumpe, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 929 days.

(21) Appl. No.: 12/479,007

(22) Filed: Jun. 5, 2009

(65) Prior Publication Data

US 2010/0312564 A1    Dec. 9, 2010

(51) Int. Cl.
*G10L 13/02* (2006.01)

(52) U.S. Cl. ...................................... 704/260
(58) Field of Classification Search .................. 704/260
See application file for complete search history.

(56) References Cited

U.S. PATENT DOCUMENTS

| | | | |
|---|---|---|---|
| 4,331,836 A * | 5/1982 | Wiggins et al. ............... 704/264 |
| 5,970,453 A | 10/1999 | Sharman |
| 6,347,299 B1 | 2/2002 | Holzman et al. |
| 6,804,330 B1 * | 10/2004 | Jones et al. ................. 379/88.01 |
| 7,062,439 B2 | 6/2006 | Brittan et al. |
| 7,143,038 B2 | 11/2006 | Katae |
| 7,194,069 B1 * | 3/2007 | Jones et al. ................. 379/88.02 |
| 7,493,259 B2 * | 2/2009 | Jones et al. ................... 704/257 |
| 7,545,917 B2 * | 6/2009 | Jones et al. ................. 379/88.02 |
| 7,552,055 B2 * | 6/2009 | Lecoeuche ................. 704/270.1 |
| 7,711,570 B2 * | 5/2010 | Galanes et al. ............... 704/277 |
| 7,735,012 B2 * | 6/2010 | Naik ............................. 715/727 |
| 7,779,357 B2 * | 8/2010 | Naik ............................. 715/727 |
| 8,121,649 B2 * | 2/2012 | Shostak ......................... 455/563 |
| 8,126,716 B2 * | 2/2012 | Dhanakshirur et al. ...... 704/258 |
| 8,160,883 B2 * | 4/2012 | Lecoeuche ................. 704/270.1 |
| 8,165,883 B2 * | 4/2012 | Galanes et al. ............... 704/270 |
| 8,185,394 B2 * | 5/2012 | Jones et al. ................... 704/257 |
| 2007/0016421 A1 | 1/2007 | Nurminen et al. |
| 2008/0281578 A1 | 11/2008 | Kumaran et al. |
| 2010/0299147 A1 * | 11/2010 | Stallard ......................... 704/235 |

OTHER PUBLICATIONS

"Yi, Jon Rong-Wei ", "Corpus-Based Unit Selection for Natural-Sounding Speech Synthesis", retrieved at <<http://groups.csail.mit.edu/sls//archives/root/publications/2003/yi_thesis.pdf>>, May 27, 2003, pp. 1-214.

"Kominek, et al", "Improving Speech Systems Built from Very Little Data", retrieved at <<http://www.cs.cmu.edu/~awb/papers/is2008/IS081379.PDF>>, Sep. 22-26, 2008, pp. 1-4.

"Speech Synthesis", retrieved at <<http://en.wikipedia.org/wiki/Speech_synthesis>>, Apr. 16, 2009, pp. 12.

\* cited by examiner

*Primary Examiner* — Susan McFadden
(74) *Attorney, Agent, or Firm* — Turk IP Law, LLC

(57) ABSTRACT

A local text to speech feedback loop is utilized to modify algorithms used in speech synthesis to provide a user with an improved experience. A remote text to speech feedback loop is utilized to aggregate local feedback loop data and incorporate best solutions into new improved text to speech engine for deployment.

20 Claims, 6 Drawing Sheets

LOCAL AND REMOTE FEEDBACK LOOP FOR SPEECH SYNTHESIS

BACKGROUND

A text-to-speech system (TTS) is one of the human-machine interfaces using speech. TTSs, which can be implemented in software or hardware, convert normal language text into speech. TTSs are implemented in many applications such as car navigation systems, information retrieval over the telephone, voice mail, speech-to-speech translation systems, and comparable ones with a goal of synthesizing speech with natural human voice characteristics. Modern text to speech systems provide users access to multitude of services integrated in interactive voice response systems. Telephone customer service is one of the examples of rapidly proliferating text to speech functionality in interactive voice response systems.

Speech synthesizers are an integral part of interactive voice response systems. Quality improvement in speech synthesizers is a costly process. It requires production of audio, user participation, and user determination about audio quality. There is very minimal or no automation in identifying faults in a speech synthesizer. And, each production of a new speech synthesizer requires a new quality improvement process.

Additionally, a speech synthesizer has one or more algorithms that decide from multiple speech options which speech sounds best. However, improvements implemented in the algorithms currently require manual evaluation by having one or more users decide quality of the improvement. As synthesizers improve more, users are required to evaluate diminutive improvements leading to diminishing returns. As a result, as interactive voice response systems get better, it gets more cost prohibitive to improve quality.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a local Text To Speech (TTS) feedback loop for improving a speech synthesizer in real time and a remote feedback loop for providing user feedback information to a developer to be used in future improvements of the synthesizer. Local and remote feedback loops may be coordinated and responses to the local feedback vary based on the feedback.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
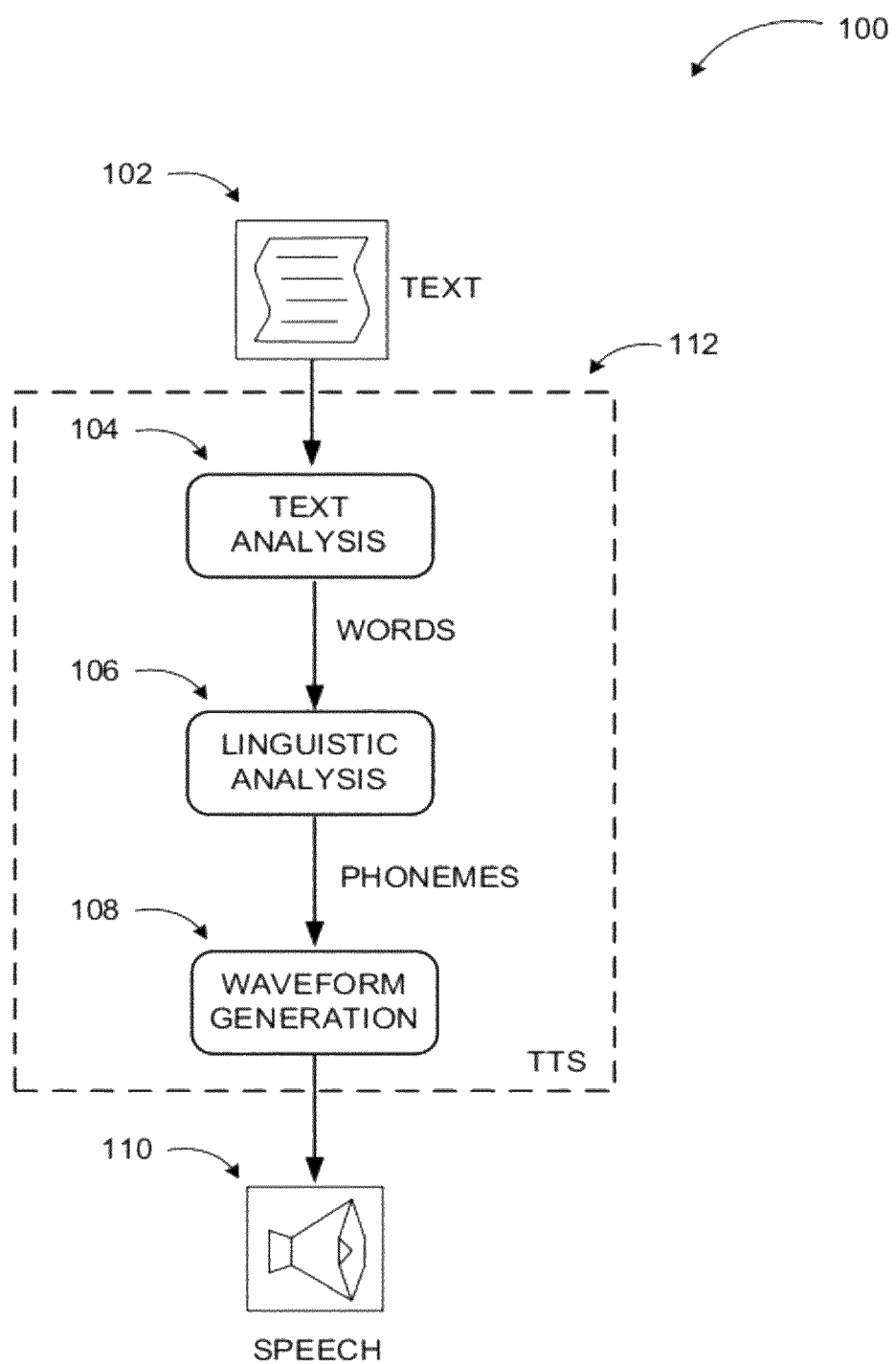
FIG. 1 is a conceptual diagram of a speech synthesis system.

As briefly described above, Text To Speech (TTS) feedback loops may be used to improve TTS engines in Interactive Voice Response (IVR) systems and other implementations. Aspects refer to local embodiment for in service improvements and remote embodiment for incorporating feedback into synthesizer updates. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "TTS" is a Text To Speech system. TTS system refers to a combination of software and hardware components for converting text to speech. Examples of platforms include, but are not limited to, an Interactive Voice Response (IVR) system such as those used in telephone, vehicle applications, and similar implementations. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. Also, the term "engine" is used to refer to a self contained software application that has input(s) and an output(s). An example of which is text input and audio output provided by TTS Engine utilized in an embodiment.

FIG. 1 is a block diagram illustrating top level components in a text to speech system. Synthesized speech can be created by concatenating pieces of recorded speech from a data store or generated by a synthesizer that incorporates a model of the vocal tract and other human voice characteristics to create a completely synthetic voice output.

Text to speech system (TTS) 112 converts text 102 to speech 110 by performing an analysis on the text to be converted, an optional linguistic analysis, and a synthesis putting together the elements of the final product speech. The text to be converted may be analyzed by text analysis component 104 resulting in individual words, which are analyzed by the linguistic analysis component 106 resulting in phonemes. Waveform generation component 108 synthesizes output speech 110 based on the phonemes.

Depending on a type of TTS, the system may include additional components. The components may perform additional or fewer tasks and some of the tasks may be distributed among the components differently. For example, text normalization, preprocessing, or tokenization may be performed on the text as part of the analysis. Phonetic transcriptions are then assigned to each word, and the text divided and marked into prosodic units, like phrases, clauses, and sentences. This text-to-phoneme or grapheme-to-phoneme conversion is performed by the linguistic analysis component 106.

The major types of generating synthetic speech waveforms include concatenative synthesis, formant synthesis, and Hidden Markov Model (HMM) synthesis. Concatenative synthesis is based on the concatenation (or stringing together) of segments of recorded speech. While producing close to natural-sounding synthesized speech, in this form of speech generation differences between natural variations in speech and the nature of the automated techniques for segmenting the waveforms may sometimes result in audible glitches in the output. Sub-types of concatenative synthesis include unit selection synthesis, which uses large databases of recorded speech. During database creation, each recorded utterance is segmented into some or all of individual phones, diphones, half-phones, syllables, morphemes, words, phrases, and sentences. An index of the units in the speech database is then created based on the segmentation and acoustic parameters like the fundamental frequency (pitch), duration, position in the syllable, and neighboring phones. At runtime, the desired target utterance is created by determining the best chain of candidate units from the database (unit selection).

Another sub-type of concatenative synthesis is diphone synthesis, which uses a minimal speech database containing all the diphones (sound-to-sound transitions) occurring in a language. A number of diphones depends on the phonotactics of the language. At runtime, the target prosody of a sentence is superimposed on these minimal units by means of digital signal processing techniques such as linear predictive coding. Yet another sub-type of concatenative synthesis is domain-specific synthesis, which concatenates prerecorded words and phrases to create complete utterances. This type is more compatible for applications where the variety of texts to be outputted by the system is limited to a particular domain.

In contrast to concatenative synthesis, formant synthesis does not use human speech samples at runtime. Instead, the synthesized speech output is created using an acoustic model. Parameters such as fundamental frequency, voicing, and noise levels are varied over time to create a waveform of artificial speech. While the speech generated by formant synthesis may not be as natural as one created by concatenative synthesis, formant-synthesized speech can be reliably intelligible, even at very high speeds, avoiding the acoustic glitches that are commonly found in concatenative systems. High-speed synthesized speech is, for example, used by the visually impaired to quickly navigate computers using a screen reader. Formant synthesizers can be implemented as smaller software programs and can, therefore, be used in embedded systems, where memory and microprocessor power are especially limited.

HMM-based synthesis is a synthesis method based on hidden Markov models. In this system, the frequency spectrum (vocal tract), fundamental frequency (vocal source), and duration (prosody) of speech are modeled simultaneously by HMMs. Speech waveforms are generated from HMMs themselves based on the maximum likelihood criterion.

There are many parameters in speech synthesis, variation of which may result in different perception by different users. For example, pitch, dialect, gender of speaker, and so on may influence how synthesized speech is perceived by users. In service related implementations where the goal is to satisfy customers, inadequate perception of the synthesized speech can impact user satisfaction negatively. Many conventional systems enable users to repeat a voice menu by asking for it or pushing a button, which may also aggravate the customer. Thus, an adaptive system according to embodiments, which can provide variations/improvements to a user real time and at the same time record feedback for subsequent upgrading of the speech synthesizer, may enhance user experience significantly.

Figure 2:
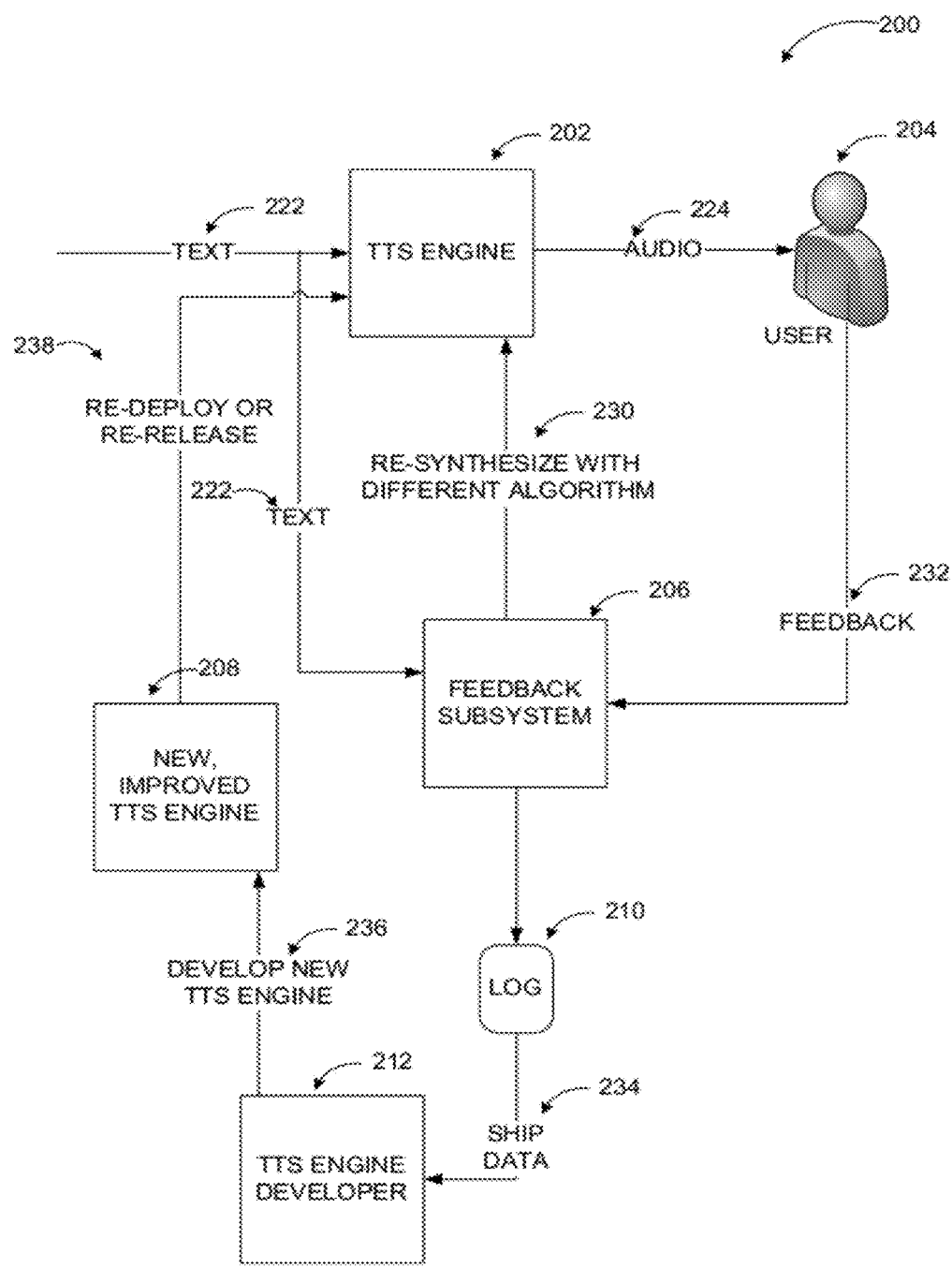
FIG. 2 is a diagram illustrating an example text to speech (TTS) feedback loop incorporating elements of a local feedback loop and a remote feedback loop.

Referring to FIG. 2, diagram 200 of an example TTS feedback loop system incorporating elements of a local feedback loop and a remote feedback loop is illustrated. Examples of the TTS system's implementation include, but are not limited to, toll-free information hotlines for airlines, product service businesses, brokerages, shipping companies, and comparable ones. While in use, a synthesizer in an IVR system may produce speech that a user may not comprehend. The user may provide feedback such as "what was that?" In a system according to embodiments, this feedback may initiate a feedback loop within the TTS system. In a local feedback loop, the synthesizer may be instructed to re-synthesize the speech and provide it to the user using a different algorithm in an attempt to provide an improved speech. Additionally, any information utilized in speech reproduction may be logged. Recorded information may be synthesized text, identification of the synthesizer (language, dialect, gender . . . ), and information about the utilized algorithm including any options used in the algorithm. These logs may be coalesced and sent to a developer of the synthesizer by any communication method including electronic mail. Communicating logs may also be by a hosted service that may render them directly available.

In other embodiments, additional user behavior may prompt initialization of the TTS feedback loop. An example may be an IVR system time-out trigger. In an example use, if a user does not respond to an IVR system, the reason may be incomprehensible speech. In such a scenario, the TTS feedback loop may initiate and provide user with re-synthesized speech. The remote feedback loop system may aggregate time-out based responses and accompanying synthesized speech. It may aggregate this data in order to provide a remote developer data on which synthetic utterances may have quality issues.

In an interactive voice response system such as the one shown in diagram 200, a user 204 may communicate with TTS engine 202 via a variety of end devices. An example end device may be, but is not limited to, a telephone. TTS engine 202 may receive text 222 and process the text and provide speech matching the text as audio 224 to the user. Finding the speech incomprehensible, the user may provide feedback 232 such as "what was that?" A feedback subsystem 206 may intercept the feedback. Initialized by the feedback, the feedback subsystem 206 may send a "re-synthesize with a different algorithm" command 230 along with the previously received text 222 to the TTS engine 202. The TTS engine 202 may re-synthesize the audio and re-send to user 204 with a potential for easier comprehension concluding the local feedback loop. Moreover, during the feedback, the feedback subsystem 206 may send feedback data to a log component 210 for recording. Data sent to log component 210 may include, but is not limited to, synthesized text, identification of the synthesizer (language, dialect, gender . . . ), and information about the utilized algorithm including any options used in the algorithm.

It should be noted that the local and remote feedback loops are separable. The user feedback may be recorded without modifying the synthesis algorithm or the algorithm may be modified without recording the feedback. Thus, a speech synthesis system according to embodiments has four main aspects: a local feedback loop that enables the system to re-synthesize with a modified algorithm in response to user feedback; a persistent local feedback loop that enables the system to record the user interaction and modify the synthesis algorithm such as following an aggregation of feedback; a remote feedback loop that enables the system to provide the user feedback to a TTS system developer for speech engine updates; and a combination of the local and remote feedback loops.

In a remote TTS feedback loop, data sent to log component 210 may be processed for an upgrade of the IVR system product. The log component 210 may aggregate and ship data (234) associated with the local feedback loop. Examples of communicating local feed loop aggregate data may include, but are not limited to, a hosted service encompassing the IVR and an on-premise server which might use an assistance application such as Watson Service® by MICROSOFT CORPORATION of Redmond, Wash. TTS engine developer 212 may analyze the aggregated local feedback loop data and incorporate it in development of a new improved TTS engine 208. The new improved TTS engine 208 may be re-deployed or re-released (238) to update or replace existing TTS engine 202. As a result, the new improved TTS engine may provide an improved experience to the user.

Figure 3:
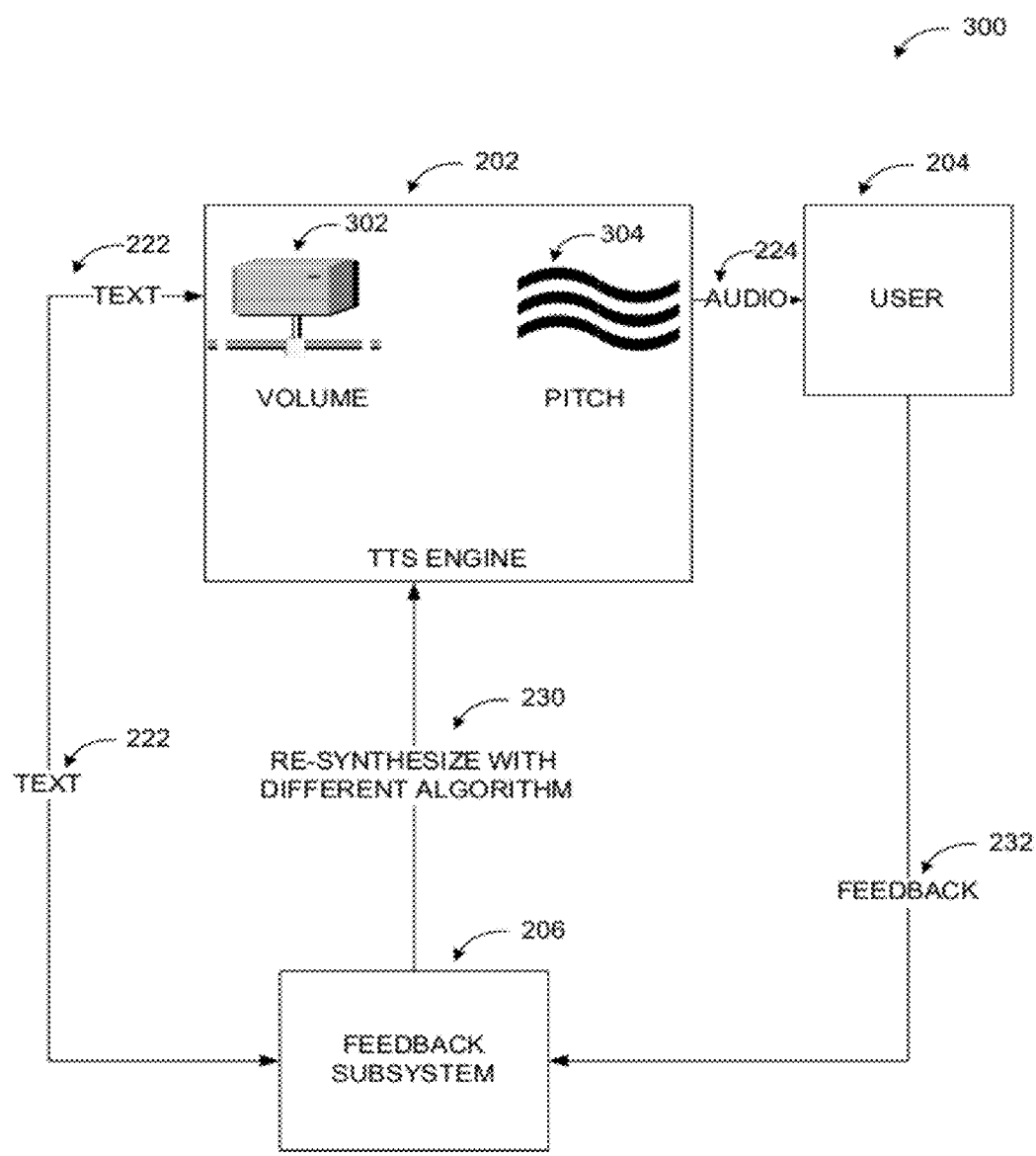
FIG. 3 is a conceptual diagram illustrating components of a TTS feedback system used in a local feedback loop.

FIG. 3 includes a conceptual diagram illustrating components of a TTS feedback system used in a local feedback loop. In the embodiment of diagram 300, TTS engine 202 receives text 222, synthesizes it and sends speech to user 204 as audio. User 204 provides feedback such as "what was that?" 232 to feedback subsystem 208. The feedback subsystem 208 sends a "re-synthesize with a different algorithm" command 230 along with previously submitted text 222 to TTS engine 202. TTS engine 202 utilizes previously submitted text 222, volume 302, and pitch 304 of utterances to produce an improved speech. TTS engine 202 does this by matching volume and pitch of utterances such as words in the text to produce the speech. Matching may be done by selecting an option from a list of options of volume and pitch of utterances and fitting the option to adjoining utterances that would result in least cost expense in matching volume and pitch. Resulting speech is potentially an improvement and provides comprehension to the user.

The feedback system described in diagram 300 is an example concatenative TTS system. It should be noted that the volume and/or pitch may be modified, but the words remain the same in a TTS feedback system according to embodiments. Embodiments may, of course, be implemented using other synthesis methods such as those discussed previously.

The TTS based systems, components, configuration, and feedback mechanisms illustrated above are for example purposes and do not constitute a limitation on embodiments. A TTS system with local and remote feedback loops may be implemented with other components and configurations using the principles described herein.

Figure 4:
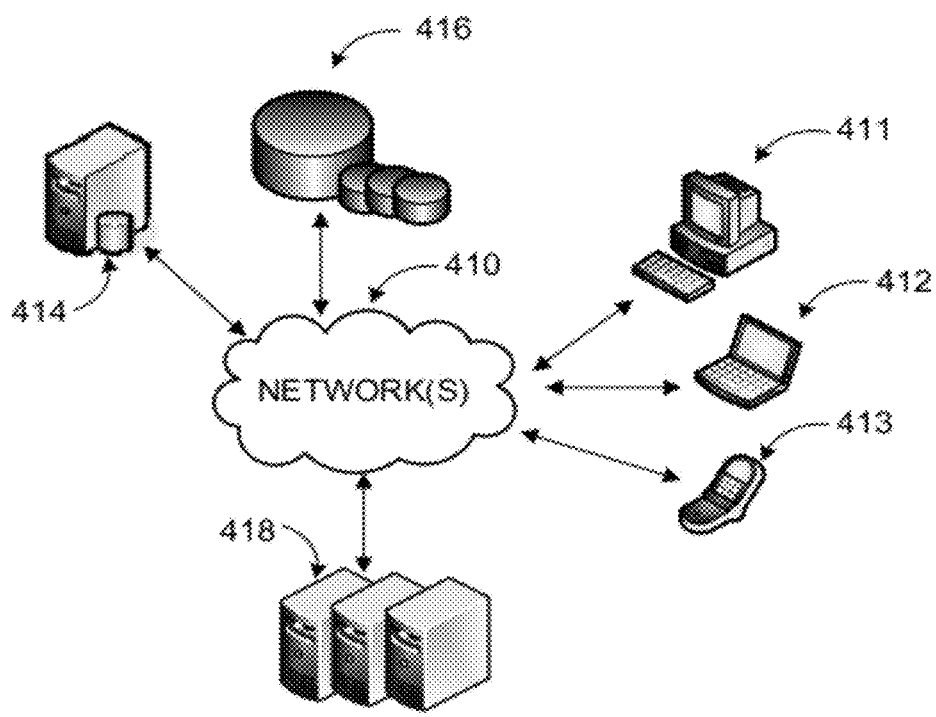
FIG. 4 is a networked environment, where a system according to embodiments may be implemented.

FIG. 4 is an example environment, where embodiments may be implemented. A TTS feedback loop system may be implemented via software executed over one or more servers 418 such as a hosted service. The platform may communicate with client applications on individual computing devices such as a cellular phone 413, a laptop computer 412, and desktop computer 411 ('client devices') through network(s) 410.

As discussed previously, client devices 411-413 are used to facilitate communications employing a variety of modes between users of the IVR system. Feedback loop information may be stored in one or more data stores (e.g. data store 416), which may be managed by any one of the servers 418 or by database server 414.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a remote TTS feedback loop incorporating aggregate feedback data in a new improved TTS engine. Furthermore, the networked environments discussed in FIG. 4 are for illustration purposes only. Embodiments are not limited to the example applications, modules, or processes.

Figure 5:
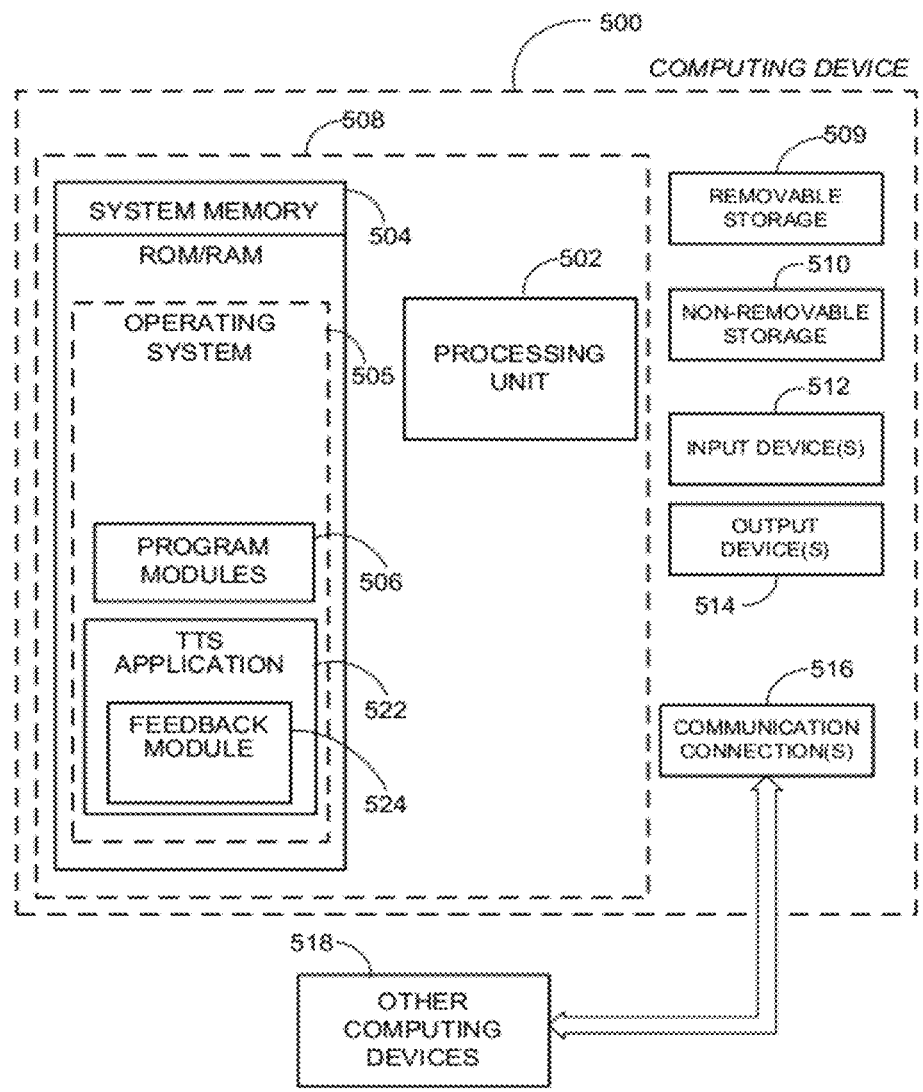
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a server executing a communication application with TTS features and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, TTS application 522, and feedback module 524.

TTS application 522 may be any application that synthesizes speech as discussed previously. Feedback module 524 may be an integral part of TTS application 522 or a separate application. Feedback module 524 may determine active or passive (e.g. delay in response) feedback from a user, provide real time feedback to a TTS engine of the TTS application 522 for real time modification of the synthesis algorithm, and record the feedback along with additional information for delivery to a developer to undertake long term changes in the synthesis mechanism. This basic configuration is illustrated in FIG. 5 by those components within dashed line 508.

As discussed above, TTS application 522 according to embodiments may utilize feedback module 524 for: a local feedback loop that enables the application to re-synthesize with a modified algorithm in response to user feedback; a persistent local feedback loop that enables the application to record the user interaction and modify the synthesis algorithm such as following an aggregation of feedback; a remote feedback loop that enables the application to provide the user feedback to a TTS system developer for speech engine updates; and/or a combination of the local and remote feedback loops.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 505, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, other directory or presence servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
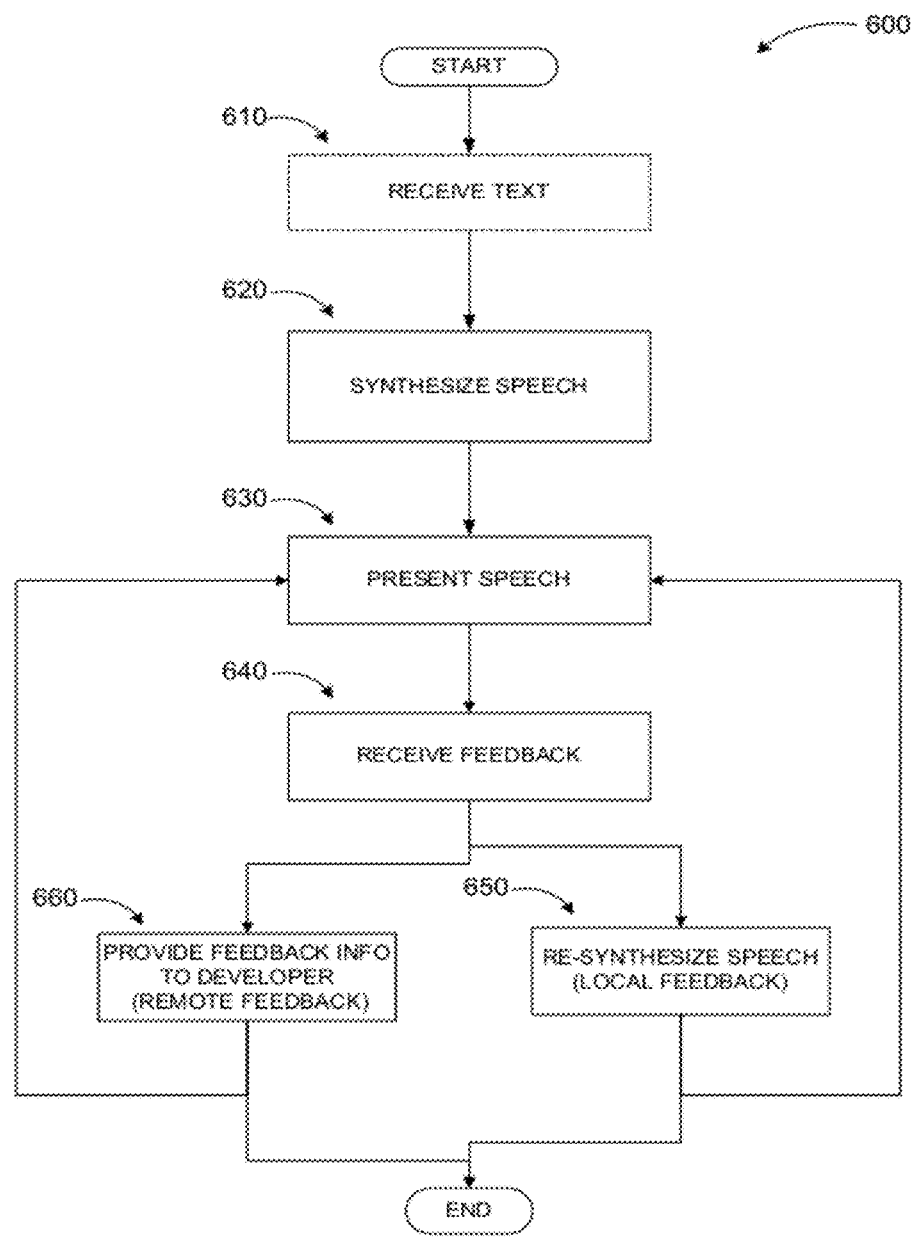
FIG. 6 illustrates a logic flow diagram for implementing a local and remote feedback looped TTS system.

FIG. 6 illustrates a logic flow diagram for process 600 of implementing a local and remote feedback looped TTS system according to embodiments. Process 600 may be implemented as part of an IVR system capable of facilitating text to speech communications.

Process 600 begins with optional operation 610, where a TTS engine receives text to be converted to speech. At operation 620, the TTS engine synthesizes speech from the received text according to predefined algorithms and parameters. This is followed by operation 630, where the synthesized speech is presented to a user. As discussed previously, some or all of the presented speech may not be comprehensible to the user. In response to the presented speech, the user may provide an active (e.g. "what's that?") or passive (e.g. delay of response in an IVR system) feedback at operation 640. The active feedback may be considered a comment or an utterance.

Upon receiving the feedback at operation 640, the TTS system may utilize a local feedback loop to re-synthesize the speech using a different algorithm or parameter at operation 650 and present to the user again back at operation 630. Alternatively or in addition, the system may also provide recorded feedback and other information to a developer for modification of the TTS engine and/or other components of the system such as the training data for the TTS engine at operation 660, which results in improved speech synthesis and presentation to the user later. The developer may also be provided statistical information associated with presentation of original and re-synthesized speeches and respective user feedbacks.

The operations included in process 600 are for illustration purposes. Improving TTS systems with local and remote feedback loops may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing synthesized speech with feedback loops, the method comprising:

receiving text to be converted to speech from one of an input device, a removable storage device, a non-removable storage device, and a communication connection of the computing device;

determining the text to be converted to speech at a processor of the computing device;
synthesizing speech based on the text employing a predefined algorithm and at least one predefined parameter at the processor of the computing device;
presenting the synthesized speech to a user through an audio output device of the computing device;
receiving a user feedback through an input device of the computing device;
interpreting the user feedback at the processor of the computing device;
re-synthesizing the speech based on the user feedback employing at least one of: a different predefined algorithm and at least one other parameter at the processor of the computing device; and
presenting the re-synthesized speech to the user through the audio output device of the computing device.

2. The method of claim 1, further comprising:
locally recording the re-synthesized speech based on the user feedback; and
utilizing the re-synthesized the speech subsequently, when the same text is to be converted to speech.

3. The method of claim 1, further comprising:
storing the user feedback locally;
providing the locally stored user feedback and information associated with the synthesized speech presented to the user to a developer for modification of a Text To Speech (TTS) system component; and
in response to receiving the modified TTS system component, synthesizing the speech employing the modified TTS system component.

4. The method of claim 3, wherein the information associated with the synthesized speech presented to the user includes at least one from a set of: the text converted to speech, an identification of a TTS engine synthesizing the speech, a language of the speech, a dialect of the speech, a gender of a speaker, and the at least one parameter associated with the synthesized speech.

5. The method of claim 3, wherein the TTS system component is one of: a TTS engine and training data for the TTS engine, and wherein modifying the TTS system component includes replacing at least one of the TTS engine and the training data for the TTS engine.

6. The method of claim 5, wherein modifying the TTS system component includes updating at least one of the TTS engine and the training data for the TTS engine.

7. The method of claim 3, wherein the stored user feedback and the information associated with the synthesized speech presented to the user are provided to the developer through one of: a transmittal by email, a real time access through a hosted service, and an assistance application associated with the TTS system.

8. The method of claim 1, wherein the at least one parameter includes one from a set of: a pitch of the synthesized speech, a dialect of the synthesized speech, a fundamental frequency of a waveform for generating the synthesized speech, a noise level, and a volume of the synthesized speech.

9. The method of claim 1, wherein the user feedback is an active feedback in form of a comment from the user.

10. The method of claim 1, wherein the user feedback is a passive feedback in form of a delay in responding to a voice prompt containing the synthesized speech from the user.

11. The method of claim 10, wherein the passive feedback is determined based on aggregating a plurality of delays in responding to voice prompts from the user employing a time-out trigger.

12. A communication system for providing synthesized speech with feedback loops, the system comprising:
a computing device executing a communication application, the computing device including:
a memory storing instructions; and
a processor configured to execute a Text To Speech (TTS) engine and a local feedback module, wherein the processor is configured to:
receive text to be converted to speech from one of an input device, a removable storage device, a non-removable storage device, and a communication connection of the computing device;
synthesize speech based on the text employing a predefined algorithm and at least one predefined parameter; and
present the synthesized speech to a user through an audio output device of the computing device ;
receive a user feedback through an input device of the computing device;
interpret the user feedback;
present a re-synthesized speech to the user employing a different algorithm through the audio output device of the computing device;
record the user feedback locally; and
utilize the re-synthesized the speech subsequently, when the same text is to be converted to speech.

13. The system of claim 12, wherein the processor is further configured to execute a remote feedback module and configured to:
locally record information associated with the synthesized speech presented to the user for modification of a TTS system component;
provide the locally recorded user feedback and the information associated with the synthesized speech to a developer;
receive a modified TTS system component; and
enable one of update and replacement of the TTS system component with the modified TTS system component.

14. The system of claim 12, wherein the communication system is part of an Interactive Voice Response (IVR) system.

15. The system of claim 14, wherein the local feedback module is further configured to interpret the user feedback by determining that a voice prompt containing the synthesized speech is not understood by the user based on a received user comment and instruct the TTS engine to re-synthesize the speech by modifying at least one from a set of: a pitch of the synthesized speech, a dialect of the synthesized speech, a fundamental frequency of a waveform for generating the synthesized speech, a noise level, and a volume of the synthesized speech.

16. The system of claim 12, wherein the computing device includes a data store for storing at least one from a set of: the user feedback, the information associated with the synthesized speech, and training data for the TTS engine.

17. A computer-readable memory device with instructions stored thereon for providing synthesized speech with feedback loops, the instructions comprising:
receiving text to be converted to speech from one of an input device, a removable storage device, a non-removable storage device, and a communication connection of the computing device;
synthesizing speech employing a predefined algorithm and a plurality of predefined parameters including at least one from a set of: a language, a pitch, a dialect, a volume, and a fundamental frequency for a waveform of the synthesized speech at a processor of the computing device presenting the synthesized speech to a user;
receiving one of an active and a passive user feedback through an input device of the computing device;
interpreting the user feedback at the processor of the computing device;
recording the user feedback and information associated with the synthesized speech including at least one from a set of: the text converted to speech, an identification of the TTS engine, a language of the speech, a dialect of the speech, a gender of a speaker, and the plurality of parameters associated with the synthesized speech through the input device of the computing device;
providing instructions to a TTS engine such that the TSS engine re-synthesizes the speech based on the user feedback employing at least one of: a different predefined algorithm and a modified parameter at the processor of the computing device;
providing the recorded user feedback and the information associated with the synthesized speech to a developer at the processor of the computing device;

receiving a modified TTS engine from the developer at the processor of the computing device; and
enabling one of update and replacement of the TTS engine with the modified TTS engine.

18. The computer-readable memory device of claim 17, wherein the active user feedback is a user utterance and the passive user feedback is a user hesitation determined based on aggregating a plurality of delays in responding to voice prompts by the user employing a time-out trigger.

19. The computer-readable memory device of claim 17, wherein the instructions further comprise:
providing the developer statistical information associated with presentation of original and re-synthesized speeches and respective user feedbacks.

20. The computer-readable memory device of claim 17, wherein the user feedback and the information associated with the synthesized speech are made available to the developer through a hosted service.

* * * * *